July 19, 1927.

F. H. JOHNSON 1,636,370

SPRINKLER SYSTEM CONTROL VALVE

Filed Nov. 16, 1925

Inventor

Frederick H. Johnson.

By Lyon & Lyon

Attorneys.

Patented July 19, 1927.

1,636,370

UNITED STATES PATENT OFFICE.

FREDERICK H. JOHNSON, OF LOS ANGELES, CALIFORNIA.

SPRINKLER-SYSTEM CONTROL VALVE.

Application filed November 16, 1925. Serial No. 69,360.

This invention relates to sprinkler system control valves and more particularly to a sprinkler system control valve having a guiding control member for guiding an actuating key into position in engagement with the guide control member so that the valve may be actuated.

In sprinkler control systems as employed for sprinkling or watering areas, such as lawns and the like, the conduits which convey or conduct the water to the individual spray nozzles are buried beneath the surface of the ground and each unit or set of units of the sprinkling system has a control valve adapted to be actuated from the surface of the lawn or the like and which valve is directly connected in the submerged or buried conduit and has a valve control member secured to the valve stem that is adapted to be engaged with a key held by the operator of the system for actuating the valve. Heretofore, this valve control member has comprised a flat disc having a pair of radially disposed slots formed therein adapted to be engaged with lugs formed on the key so that the valve stem may be rotated to actuate the valve. This valve control disc is buried in the ground, usually located a distance below the surface of the ground and out of direct vision of the operator. It is a tedious job to engage the lugs of the key with the slots of the disc control member and requires a searching operation or feeling operation of the operator to insert the lugs within the slots.

It is therefore an object of this invention to provide a control member for sprinkler system control valves which are submerged below the surface of the ground which is so formed as to guide the key lugs accurately into the slots formed in the said control member on engagement of the key with the said control member.

Another object of this invention is to provide a control member of inexpensive construction and which may be cast, stamped or otherwise formed in one operation so as to provide a guide for guiding the key accurately into the slots when it is desired to actuate the valve.

Other objects and advantages of this invention will be apparent from the following detailed description of a preferred embodiment thereof as illustrated in the accompanying drawings, in which drawings.

Figure 1:
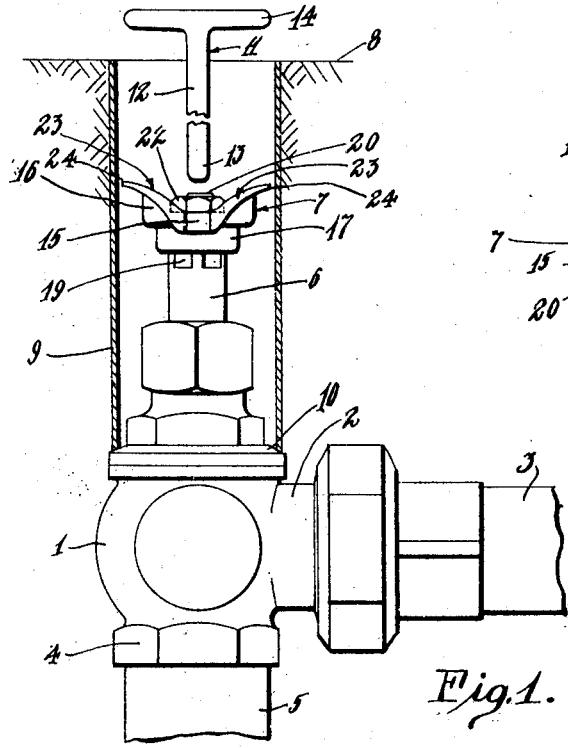
Figure 1 is a side elevation of a sprinkler system control valve having connected therewith a guide control member embodying this invention and illustrating the valve in position connected within the sprinkler system conduits in a position submerged below the surface of the ground.
Figure 2:
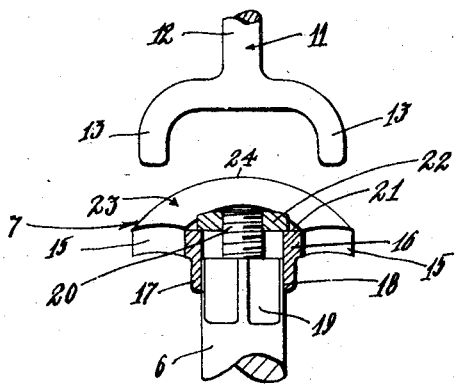
Figure 2 is a central sectional side elevation thereof taken at right angles to the position of the control member as illustrated in Figure 1.
Figure 3:
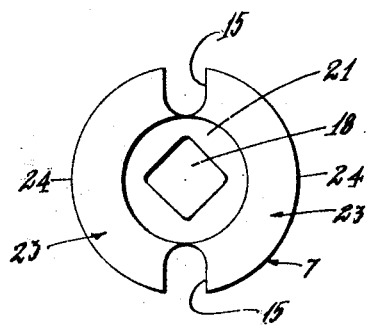
Figure 3 is a top plan view thereof.

In the preferred embodiment of this invention illustrated in the accompanying drawings, 1 illustrates a sprinkler system control valve having its outlet branch 2 connected with a sprinkler connecting conduit 3 and its inlet branch 4 connected with a supply line connecting pipe 5. 6 illustrates the valve stem of the control valve 1. A guide control member 7 is illustrated as secured to the upper end of the valve stem 6 in position to rotate the valve stem 6, so as to actuate the valve 1 to regulate the flow of water from the conduit 5 through the valve 1 to the conduit 3. The valve 1 is submerged under the surface of the ground which is illustrated at 8 and a sleeve 9 surrounds the valve stem 6 and guide control member 7 and rests at its lower end upon the shoulder 10 of the valve 1. A key 11 of the customary or preferred construction for actuating the valve control member 7 is provided, which key 11 has an elongated shank 12 connected at its lower end to a pair of spaced locks 13 and connected at its upper end with a handle 14. The locks 13 of the key 11 are adapted to be engaged within diametrically opposed slots 15 formed in the control member 7 for rotating the control member 7 and the valve stem 6 to actuate the valve 1. The guide control member 7 is preferably of the following construction:

A body 16 is provided with a downwardly extending boss 17 which has a square centrally disposed hole 18 formed therein adapted to be engaged with the milled square at 19 of the valve stem 6. A portion 20 of the valve stem 6 is of reduced diameter and is threaded throughout its length. A flat seat 21 surrounds the square hole 18 and the nut 22 which is screw-threaded to the reduced section 20 and the valve stem 19 seats upon the flat disc portion 21. The body 16 of the guide control member 7 is formed to provide a pair of guide wings 23 which extend upwardly in curved relation upon the slots 15 to a central point 24 upon which the guide wings 23 taper off in a curved path to the edge of the slots 15.

From the foregoing, it will be obvious that as the key 11 is inserted within the sleeve 9 and is loosely held, that the same will engage the oppositely disposed wings 23 and will be guided over the inclined and tapered surfaces thereof directly into the slots 15 without the necessity of the operator turning the shank of the key 11 so as to feel or locate the position of the slots 15.

Having fully described a preferred embodiment of this invention, it is to be understood that I do not wish to be limited to the exact details herein set forth which may obviously be varied without departing from the spirit of my invention as set forth in the appended claim.

I claim:

In a device of the class described, the combination of a valve control member adapted to be secured to a valve stem, and comprising a body having a flat disc portion said body being provided with a pair of spaced diametrically opposed slots extending to the said flat disc portion, and a pair of curved wings formed at diametrically opposed points of the said body and extending upwardly in curved relation from the said slots for guiding an actuating member into the said slots.

Signed at Los Angeles, California, this 6th day of November, 1925.

FREDERICK H. JOHNSON.